United States Patent
Hahakura et al.

(10) Patent No.: US 9,770,824 B2
(45) Date of Patent: Sep. 26, 2017

(54) CEILING MOUNTED ROBOT WITH RELAY CABLE AND CONNECTOR PORTION

(71) Applicant: Seiko Epson Corporation, Tokyo (JP)

(72) Inventors: Seiji Hahakura, Azumino (JP); Masato Yokota, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/691,941

(22) Filed: Apr. 21, 2015

(65) Prior Publication Data

US 2015/0321344 A1    Nov. 12, 2015

(30) Foreign Application Priority Data

May 7, 2014    (JP) ................................ 2014-095737

(51) Int. Cl.
| | | |
|---|---|---|
| B25J 19/00 | (2006.01) | |
| B25J 19/02 | (2006.01) | |
| B25J 19/04 | (2006.01) | |
| B25J 9/00 | (2006.01) | |
| B25J 9/04 | (2006.01) | |

(52) U.S. Cl.
CPC ............ *B25J 9/0018* (2013.01); *B25J 9/044* (2013.01); *B25J 19/0029* (2013.01); *B25J 19/0033* (2013.01); *B25J 19/023* (2013.01); *B25J 19/04* (2013.01); *B25J 19/025* (2013.01); *Y10T 74/20311* (2015.01)

(58) Field of Classification Search
CPC ...... B25J 9/0018; B25J 19/0029; B25J 19/04; B25J 19/023; B25J 19/025
See application file for complete search history.

(56) References Cited

U.S. PATENT DOCUMENTS

| 5,065,062 A | * | 11/1991 | Uehara | ................ B25J 19/0029 |
| | | | | 901/49 |
| 5,205,701 A | * | 4/1993 | Kigami | .................... B25J 9/044 |
| | | | | 414/744.5 |
| 2003/0200831 A1 | * | 10/2003 | Matsumoto | .......... B25J 19/0029 |
| | | | | 74/490.06 |
| 2004/0034976 A1 | | 2/2004 | Wakizako et al. | |

(Continued)

FOREIGN PATENT DOCUMENTS

| JP | 2007-175849 A | 7/2007 |
| WO | WO-2010-010598 A1 | 1/2010 |
| WO | WO-2012-029173 A1 | 3/2012 |

OTHER PUBLICATIONS

Mitsubishi Industrial Robot Series RH-3SDHR Series Standard Specifications Manual, Jan. 1, 2012, pp. 1-266, XP055260432, mitsubishielectric.com, Retrieved from the internet: https://za3a.mitsubishielectric.com/fa/en/mymitsubishi/download_manager?id=6347.*

(Continued)

*Primary Examiner* — Gerald McClain
(74) *Attorney, Agent, or Firm* — Harness, Dickey & Pierce, P.L.C.

(57) ABSTRACT

A ceiling mounted robot includes a first member, a first arm portion that is rotatably provided on the first member via a first joint portion, a second arm portion that is rotatably provided on the first arm portion via a second joint portion, a wiring portion that is inserted into the first arm portion and the second arm portion, and a connector portion that is connected to the wiring portion.

2 Claims, 5 Drawing Sheets

(56) References Cited

U.S. PATENT DOCUMENTS

| | | | | |
|---|---|---|---|---|
| 2005/0166699 A1* | 8/2005 | Meyerhoff | ............... | B25J 9/044 |
| | | | | 74/490.01 |
| 2009/0200722 A1* | 8/2009 | Nakano | ................ | B25J 19/0029 |
| | | | | 269/61 |
| 2011/0111622 A1* | 5/2011 | Koyama | .............. | B25J 19/0029 |
| | | | | 439/577 |
| 2013/0152722 A1* | 6/2013 | Kumagai | ............... | B25J 9/0018 |
| | | | | 901/23 |
| 2015/0127147 A1* | 5/2015 | Yamazaki | .............. | B25J 13/088 |
| | | | | 901/9 |

OTHER PUBLICATIONS

Extended European Search Report for Application No. EP 15 16 1336 dated Apr. 1, 2016 (7 pages).
Mitsubishi Industrial Robot Series RH-3SDHR Series Standard Specifications Manual, Jan. 1, 2012, pp. 1-266, XP055260432, mitsubishielectric.com, Retrieved from the internet: URL:https://za3a.mitsubishielectric.com/fa/en/mymitsubishi/download_manager?id=6347.

\* cited by examiner

CEILING MOUNTED ROBOT WITH RELAY CABLE AND CONNECTOR PORTION

BACKGROUND

1. Technical Field

The present invention relates to a ceiling mounted robot.

2. Related Art

Typically, an industrial robot with an articulated arm is installed on the ground, and for example, is configured in such a manner as to assemble a predetermined structural body on a work bed. The movement envelope of the articulated arm excludes an envelope in which the articulated arm interferes with a base of the industrial robot installed on the ground.

The ceiling mounted robot is an industrial robot, the base of which is installed on a ceiling so as to avoid interference between the articulated arm and the base. This articulated arm can have a wide movement envelope around the base of 360° or greater.

A ceiling mounted SCARA robot disclosed in International Publication No. 2012/029173 is known as an example of such a ceiling mounted robot. The ceiling mounted robot has a base; a first arm portion that is rotatably provided on the base via a first joint portion; and a second arm portion that is rotatably provided on the first arm portion via a second joint portion. The ceiling mounted robot is configured in such a manner that a predetermined tool such as a hand device can be attached to a tip portion of a movable shaft portion which is provided in the second arm portion.

For example, there is an industrial robot that has a camera installed on an articulated arm, and can confirm the position of a tip portion of an articulated arm with respect to a structural body. In an industrial robot with a base installed on the ground, a relay cable such as a communication cable of such a camera can be directly connected to a controller or the like that is installed on the outside.

However, since a ceiling mounted robot has a wide movement envelope, when a camera or the like is installed on an articulated arm, and a relay cable is directly connected to an outside device, the relay cable may become entangled with the articulated arm, and a load may be applied to the relay cable.

SUMMARY

An advantage of some aspects of the invention is provide a ceiling mounted robot that is possible to decrease a load applied to a relay cable.

An aspect of the invention is directed to a ceiling mounted robot including: a first member; a first arm portion that is rotatably provided on the first member via a first joint portion; a second arm portion that is rotatably provided on the first arm portion via a second joint portion; a relay cable that is inserted into the first arm portion and the second arm portion; and a connector portion that is connected to the relay cable.

In this configuration of the aspect of the invention, when the relay cable is inserted into the first arm portion and the second arm portion, and is connected to the connector portion, the relay cable can be connected to a camera or the like that is installed on an articulated arm. In this configuration, since the relay cable is routed through the inside of the articulated arm, even when the articulated arm moves, the relay cable is not entangled with the articulated arm.

In the ceiling mounted robot according to the aspect of the invention, the connector portion may be provided on a lower surface of the second arm portion in the direction of gravity.

In this configuration of the aspect of the invention, the connector portion is exposed to the outside from the second arm portion close to an acting point that performs work, and thereby it is possible to establish a short connection path between the connector portion and a camera or the like that is installed close to the acting point. The acting point is installed closer to the bottom surface of the second arm portion than the side surface, and thereby it is possible to establish a connection path between the bottom surface and a camera or the like shorter than that between the side surface and the camera or the like.

In the ceiling mounted robot according to the aspect of the invention, the connector portion may be provided on a side surface of the second arm portion.

In this configuration of the aspect of the invention, the connector portion is exposed to the outside from the second arm portion close to an acting point that performs work, and thereby it is possible to establish a short connection path between the connector portion and a camera or the like that is installed close to the acting point. When the side surface of the second arm portion is connected to a camera or the like, the connection can be established above the bottom surface of the second arm portion, and thereby it is possible to prevent a cable from sagging.

In the ceiling mounted robot according to the aspect of the invention, a plurality of connector portions may be provided.

In this configuration of the aspect of the invention, a plurality of devices can be installed on the articulated arm, and the relay cables can be routed to the devices without being entangled with the articulated arm.

The ceiling mounted robot according to the aspect of the invention may further include a hollow movable shaft portion that is provided in the second arm portion, and can move with respect to the second arm portion, in which the relay cable may be inserted into the movable shaft portion.

In this configuration of the aspect of the invention, the relay cable can be inserted into the hollow movable shaft, and can be connected to a hand or the like that is mounted on a tip portion of the movable shaft portion.

The ceiling mounted robot according to the aspect of the invention may further include an imaging portion that is connected to the relay cable via the connector portion.

In this configuration of the aspect of the invention, the relay cable can be connected to the imaging unit via the connector portion. The "imaging unit" is a device that includes a communication cable connected to the connector portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a ceiling mounted robot according to an embodiment of the invention will be described with reference to the accompanying drawings.

Figure 1:
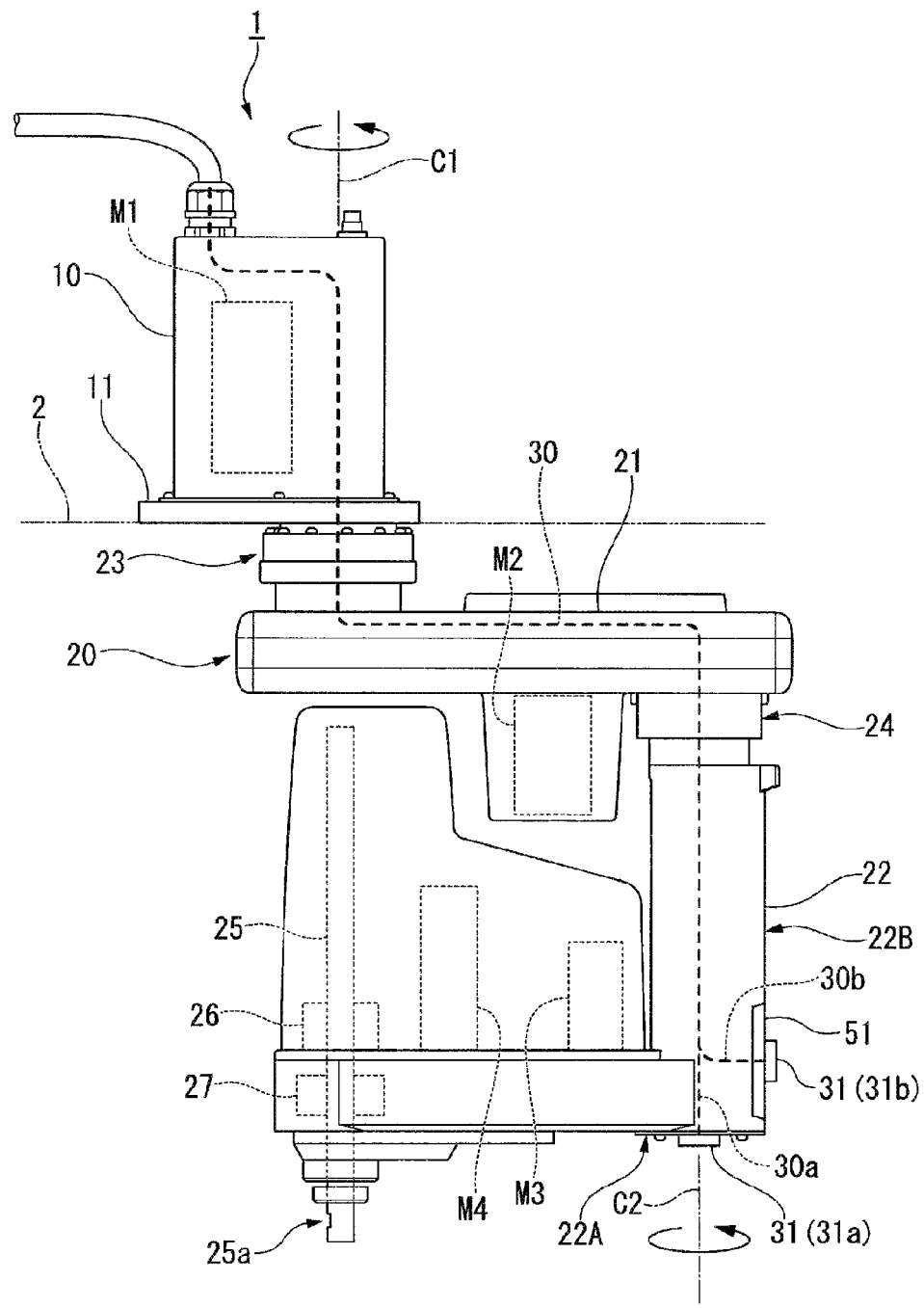
FIG. 1 is a view illustrating the entire configuration of a ceiling mounted robot according to an embodiment of the invention.

FIG. 1 is a view illustrating the entire configuration of a ceiling mounted robot 1 according to the embodiment of the invention.

As illustrated in FIG. 1, the ceiling mounted robot 1 of the embodiment is a selective compliance articulated robot arm (SCARA) robot that is suspended from a ceiling surface 2. The ceiling mounted robot 1 includes a base (first member) 10, and an articulated arm 20 that has a movement envelope of at least 360° around the base 10. For example, in the articulated arm 20 of the embodiment, a first arm portion 21 can rotate at ±225°, and a second arm portion 22 can rotate at ±225°.

The base 10 has an installation portion 11. The installation portion 11 is a plate-like member attached to a lower portion of the base 10. The installation portion 11 is installed on the ceiling surface 2. For example, the ceiling surface 2 is formed of a pair of beam portions of a structural body for installation which is positioned above a work bed. The installation portion 11 is disposed in such a manner as to be laid between the pair of beam portions, and is installed with screw members or the like. A first motor M1 is provided in the base 10, and drives the articulated arm 20.

The articulated arm 20 has the first arm portion 21 and the second arm portion 22. The first arm portion 21 is rotatably provided on the base 10 via a first joint portion 23. The first joint portion 23 includes a bearing portion by which the first arm portion 21 is supported in such a manner as to be rotatable around an axial center C1, and a speed reducer portion that reduces the rotational speed of the first motor M1. The first arm portion 21 is driven via a speed reducer mechanism that is connected to the first motor M1 via a belt, and the first arm portion 21 can rotate around the axial center C1 in a horizontal plane. A second motor M2 is provided in the first arm portion 21, and drives the second arm portion 22.

The second arm portion 22 is rotatably provided on the base 10 via a second joint portion 24. The second joint portion 24 includes a bearing portion (to be described later) by which the second arm portion 22 is supported in such a manner as to be rotatable around an axial center C2, and a speed reducer portion (to be described later) that reduces the rotational speed of the second motor M2. The second arm portion 22 is driven via a speed reducer mechanism that is connected to the second motor M2 via a belt, and the second arm portion 22 can rotate around the axial center C2 in a horizontal plane. The second arm portion 22 is provided with a working shaft (movable shaft portion) 25 and a third motor M3 and a fourth motor M4 which drive the working shaft 25.

The working shaft 25 is a shaft for performing predetermined work on the work bed, and an end effector such as a hand device or a welding device can be attached to a lower end portion 25a of the working shaft 25. The working shaft 25 is a hollow columnar shaft body, and a spline groove and a ball screw groove are formed in the circumferential surface of the working shaft 25. A spline nut 26 engages with the spline groove of the working shaft 25. A ball screw nut 27 engages with the ball screw groove of the working shaft 25.

When the spline nut 26 connected to the third motor M3 via a belt rotates, torque is transmitted to the working shaft 25, and the working shaft 25 can rotate around the axial center thereof. When the ball screw nut 27 connected to the fourth motor M4 via a belt rotates, the spline nut 26 stops rotating, and the working shaft 25 can move (linearly move) with respect to the second arm portion 22 in the direction of gravity (in a predetermined direction).

In the articulated arm 20, the arm length of the first arm portion 21 is set to be the same as that of the second arm portion 22. The arm length of the first arm portion 21 is the distance between the axial center C1 of the first joint portion 23 and the axial center C2 of the second joint portion 24. The arm length of the second arm portion 22 is the distance between the axial center C2 of the second joint portion 24 and the center of the working shaft 25. The first arm portion 21 and the second arm portion 22 are configured in such a manner as to be able to cross each other without interfering with each other because the respective working planes thereof deviate vertically from each other.

A wiring portion (a wiring, or a relay cable) 30 passes through the inside of the articulated arm 20 of the embodiment. The wiring portion 30 is a cable harness into which a plurality of wirings are bundled, and includes a communication cable (for example, an M/C cable, a LAN cable, or an optical cable). The wiring portion 30 of the embodiment is inserted into the first arm portion 21 and the second arm portion 22. The wiring portion 30 is divided into a cable 30a and a cable 30b, the cable 30a is connected to a connector portion 31 (31a), and the cable 30b is connected to a connector portion 31 (31b) in the second arm portion 22.

Figure 2:
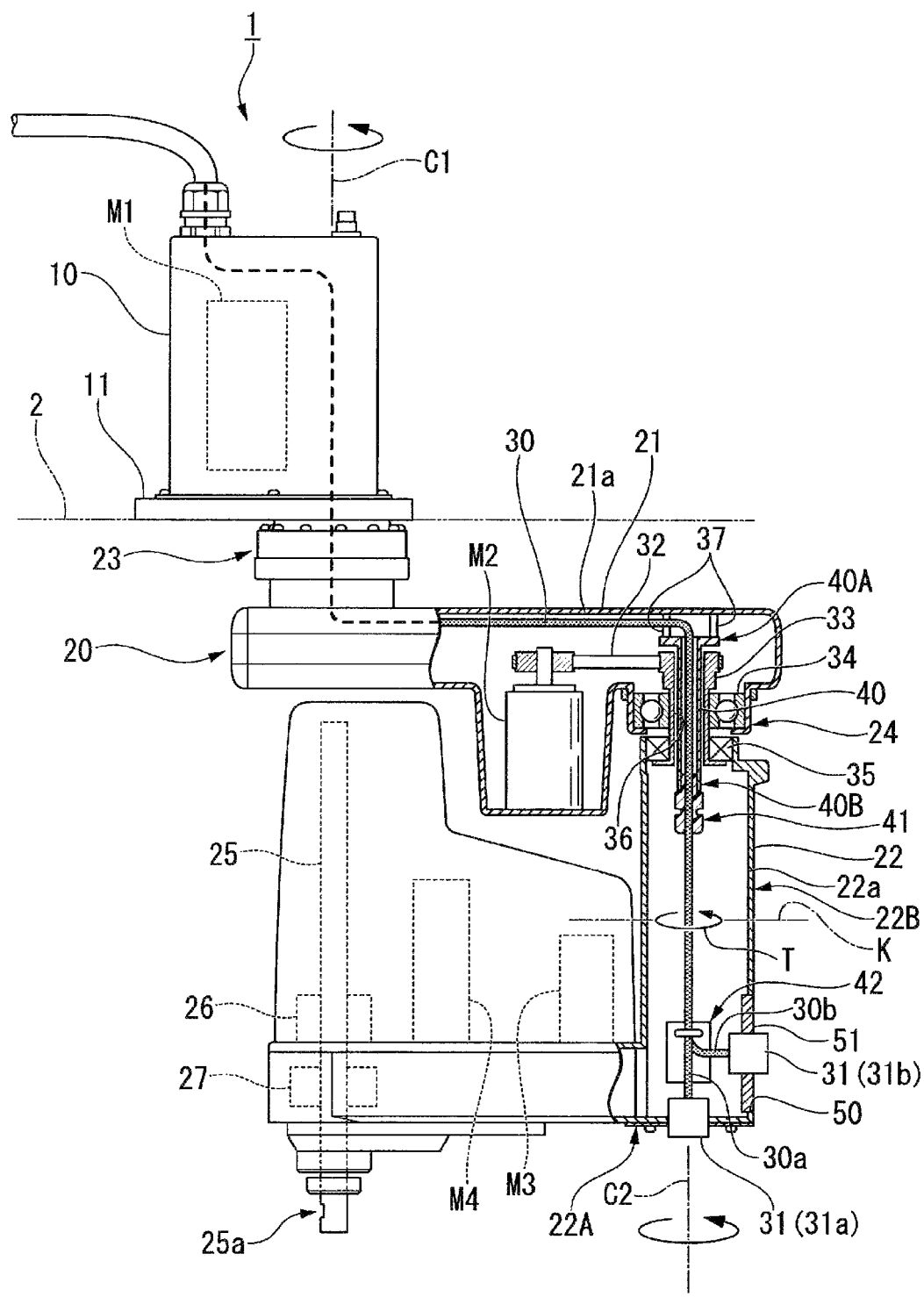
FIG. 2 is a partial cross-sectional view illustrating the inner configuration of the ceiling mounted robot according to the embodiment of the invention.

FIG. 2 is a partial cross-sectional view illustrating the inner configuration of the ceiling mounted robot 1 according to the embodiment of the invention.

As illustrated in FIG. 2, the first arm portion 21 has a housing 21a having a hollow structure into which the wiring portion 30 can be inserted. The second arm portion 22 has a housing 22a having a hollow structure into which the wiring portion 30 can be inserted. The wiring portion 30 is introduced from the inside of the housing 21a of the first arm portion 21 to the inside of the housing 22a of the second arm portion 22 via the second joint portion 24.

The second joint portion 24 has a hollow cylindrical shaft portion 33 that is connected to the second motor M2 via a belt 32; a bearing portion 34 that rotatably supports the shaft portion 33; and a speed reducer portion 35 that reduces the rotational speed of the shaft portion 33 via rolling elements such as balls or rollers, and transmits the reduced speed to the second arm portion 22. As described above, the second joint portion 24 is a speed reducer having a hollow structure, and a through hole 36 is formed at the center of the second joint portion 24. A hollow pipe (pipe portion) 40 is disposed in the through hole 36, and introduces the wiring portion 30 into the second arm portion 22.

A first end portion 40A of the hollow pipe 40 is fixed to the first arm portion 21, and a second end portion 40B of the hollow pipe 40 passes through the second joint portion 24, and is inserted into the second arm portion 22. The hollow pipe 40 is a hollow cylindrical pipe, and the first end portion 40A of the hollow pipe 40 is formed so as to have a flange shape, and is suspended from an inner surface of the housing 21a of the first arm portion 21 via a plurality of columns 37. The hollow pipe 40 is provided in non-contact with the through hole 36. That is, the second end portion 40B of the hollow pipe 40 is formed so as to have a diameter smaller than that of the through hole 36, and is inserted into the housing 22a of the second arm portion 22.

A first fixing portion 41 for fixing the wiring portion 30 is provided at the second end portion 40B of the hollow pipe 40 inserted into the second arm portion 22. The first fixing portion 41 fixes the wiring portion 30 to the second end portion 40B of the hollow pipe 40. The first fixing portion 41 of the embodiment is formed of a tubular resin (for example, silicone) member that can be press-inserted between the wiring portion 30 and the hollow pipe 40. The first fixing portion 41 fixes the wiring portion 30 at a position higher than the center (indicated by K in FIG. 2) of the second arm portion 22 suspended from the first arm portion 21 in the direction of gravity.

A second fixing portion 42 for fixing the wiring portion 30 is provided at a position lower than the center K of the second arm portion 22 in the direction of gravity. The second fixing portion 42 fixes the wiring portion 30 to the second arm portion 22. A window for work (opening portion) 50 is formed in the second arm portion 22, and is opened in such a manner that the second fixing portion 42 can be seen from the outside therethrough. A cover member 51 is attachably and detachably attached to the window for work 50 using screw members (not illustrated).

Figure 3:
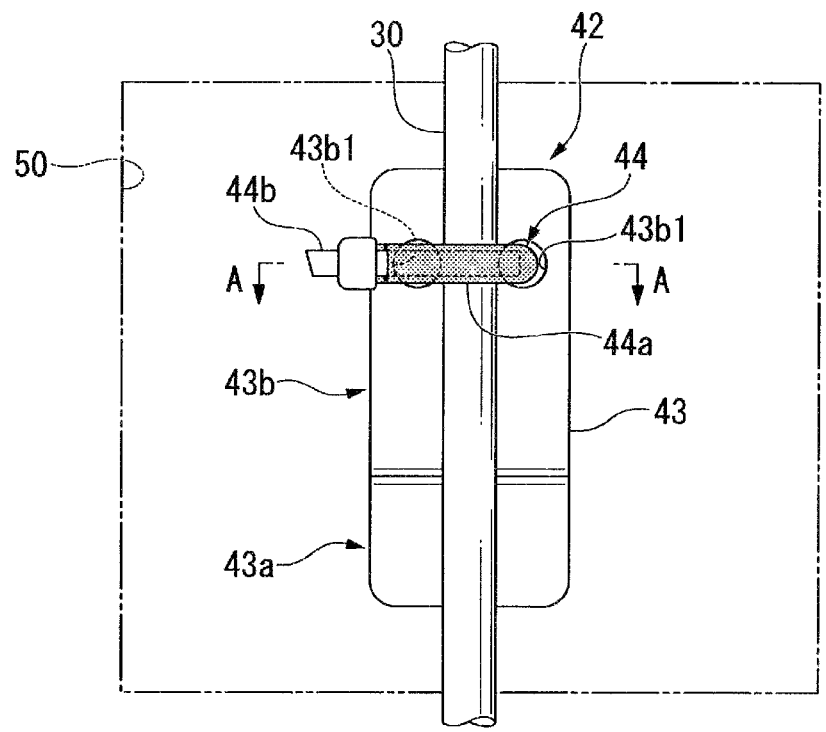
FIG. 3 is a front view illustrating the configuration of a second fixing portion according to the embodiment of the invention.
Figure 4:
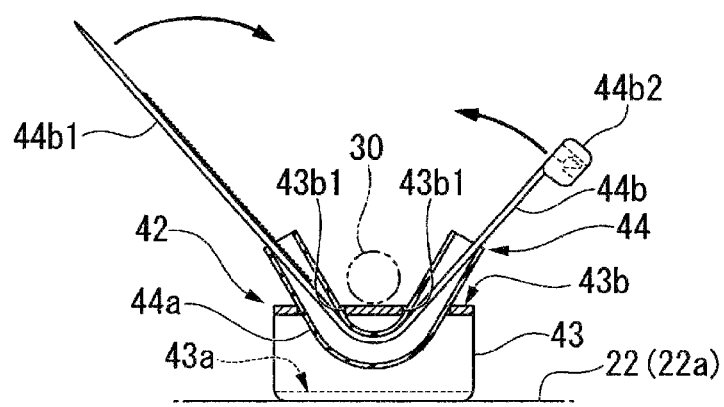
FIG. 4 is a cross-sectional view taken along line A-A illustrated in FIG. 3.

FIG. 3 is a front view illustrating the configuration of the second fixing portion 42 according to the embodiment of the invention. FIG. 4 is a cross-sectional view taken along line A-A illustrated in FIG. 3.

As illustrated in FIGS. 3 and 4, the second fixing portion 42 is formed of a plate portion 43 attached to an inner surface of the housing 22a of the second arm portion 22, and a binding portion 44 that is provided in the plate portion 43. The plate portion 43 is a metal plate bent into a stepped shape. The plate portion 43 has an attachment portion 43a that is in contact with and attached to the second arm portion 22, and a support portion 43b that is not in contact with the second arm portion 22 and supports the binding portion 44. A pair of hole portions 43b1 is provided in the support portion 43b.

The binding portion 44 has an elastic member 44a that passes through the pair of hole portions 43b1, and a binding member 44b that passes through the pair of hole portions 43b1 and binds the wiring portion 30 to the plate portion 43. The elastic member 44a is formed of a tubular resin (for example, silicone) member into which the binding member 44b can be inserted. The binding member 44b has a belt-like band portion 44b1, and a lock portion 44b2 that is provided in one end portion of the band portion 44b1, and locks the other end portion of the band portion 44b1. As illustrated in FIG. 4, the binding member 44b is inserted into the elastic member 44a, and binds the wiring portion 30 via the elastic member 44a.

As illustrated in FIG. 2, the wiring portion 30 fixed to the second fixing portion 42 is connected to the connector portion 31. The connector portion 31 has at least any one of female and male connecting portions. The connector portion 31 of the embodiment is configured in such a manner that the female connecting portion is exposed to an outer side of the second arm portion 22, and can be connected to an external device attached to the articulated arm 20. The connector portion 31a is exposed to the outside from a bottom surface 22A (a portion of the bottom surface 22A being positioned so as to correspond to the axial center C2) of the second arm portion 22 that is suspended from the first arm portion 21 in the direction of gravity. The connector portion 31b is exposed to the outside from a side surface 22B (a portion of the side surface 22B being positioned so as to correspond to the cover member 51) of the second arm portion 22 that is suspended from the first arm portion 21 in the direction of gravity.

Figure 5:
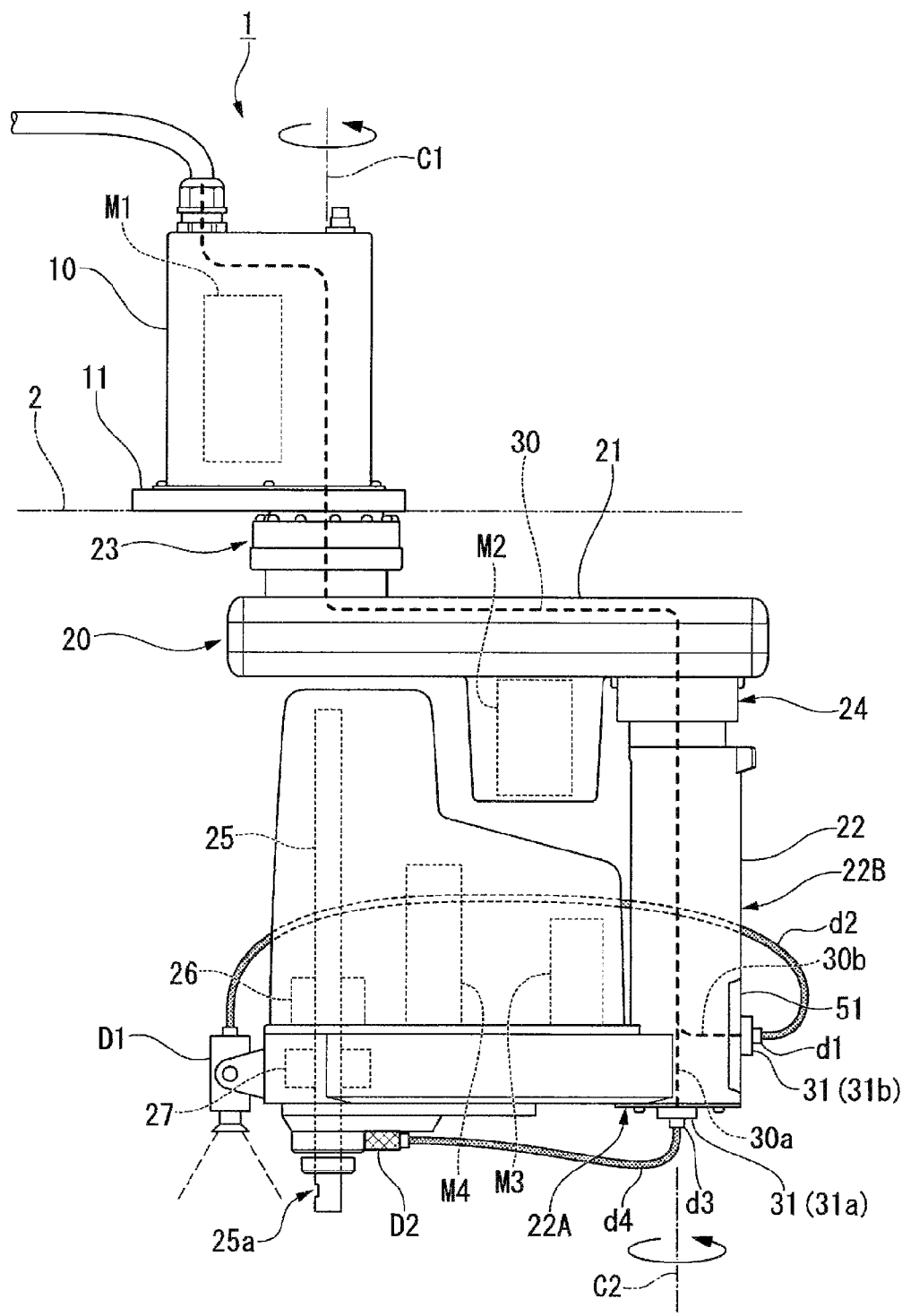
FIG. 5 is a schematic view illustrating a state in which external devices are attached to the ceiling mounted robot according to the embodiment of the invention.

FIG. 5 is a schematic view illustrating a state in which external devices D1 and D2 are attached to the ceiling mounted robot 1 according to the embodiment of the invention.

As illustrated in FIG. 5, the external devices D1 and D2 are attached to an outer surface of the second arm portion 22. For example, the external device D1 is a camera (imaging unit) that captures images of the working shaft 25. The external device D1 has a cable d2 to which a connector portion d1 is connected, and is connected to the connector portion 31b. For example, the external device D2 is a distance measuring unit that measures the distance from a structural body on the work bed. The external device D2 has a cable d4 to which a connector portion d3 is connected, and is connected to the connector portion 31a.

As described above, in the adopted configuration of the embodiment, the ceiling mounted robot 1 includes the base 10; the first arm portion 21 that is rotatably provided on the base 10 via the first joint portion 23; the second arm portion 22 that is rotatably provided on the first arm portion 21 via the second joint portion 24; the wiring portion 30 that is inserted into the first arm portion 21 and the second arm portion 22; and the connector portion 31 that is connected to the wiring portion 30.

As illustrated in FIG. 5, in such an adopted configuration of the embodiment, when the wiring portion 30 is inserted into the first arm portion 21 and the second arm portion 22, and is connected to the connector portion 31, the connector portion 31 can be connected to the external devices D1 and D2 that are provided on the articulated arm 20. In this configuration, since the wiring portion 30 is routed through the inside of the articulated arm 20, even when the articulated arm 20 moves, the wiring portion 30 is not entangled with the articulated arm 20.

In the adopted configuration of the embodiment, the connector portion 31a is provided on the bottom surface 22A on a lower side of the second arm portion 22 in the direction of gravity.

As illustrated in FIG. 5, in such an adopted configuration of the embodiment, the connector portion 31 is exposed to the outside from the second arm portion 22 close to the working shaft (acting point) 25 that performs work, and thereby it is possible to establish a short connection path between the connector portion 31 and the external device D2 that is installed close to the working shaft 25. In addition, the working shaft 25 is installed closer to the bottom surface 22A of the second arm portion 22 than the side surface 22B thereof, and thereby it is possible to establish a connection path between the bottom surface 22A and the external device D2 shorter than that between the side surface 22B and the external device D2.

In the adopted configuration of the embodiment, the connector portion 31b is provided on the side surface 22B of the second arm portion 22.

In such an adopted configuration of the embodiment, the connector portion 31 is exposed to the outside from the second arm portion 22 close to the working shaft 25 that performs work, and thereby it is possible to establish a short connection path between the connector portion 31 and the external device D1 that is installed close to the working shaft 25. When the side surface 22B of the second arm portion 22 is connected to the external device D1 installed close to the working shaft 25, the connection can be established above the bottom surface 22A, and thereby it is possible to prevent the cable d2 from being loose and sagging.

In the adopted configuration of the embodiment, a plurality of the connector portions 31 are provided.

In such an adopted configuration of the embodiment, a plurality of the external devices D1 and D2 can be installed on the articulated arm 20, and the wiring portion 30 connected to the external devices D1 and D2 via the respective connector portions 31 can be routed without being entangled with the articulated arm 20. Accordingly, it is possible to add a plurality of functionalities to the ceiling mounted robot 1.

In the embodiment, the wiring portion 30 is routed through the inside of the articulated arm 20, and is prevented from being entangled with other portions; however, when the wiring portion 30 includes a plurality of the large-diameter cables 30a and 30b and a large-diameter communication cable, the wiring portion 30 occupies a large amount of the inner space of the hollow pipe 40, and rubbing therebetween is likely to occur in a narrow passage space in the second joint portion 24 between the first arm portion 21 and the second arm portion 22, each of which rotates on its way. Accordingly, a large load may be applied to the wiring portion 30.

In the adopted configuration of the embodiment, as illustrated in FIG. 2, the ceiling mounted robot 1 has the base 10; the first arm portion 21 that is rotatably provided on the base 10 via the first joint portion 23; the second arm portion 22 that is rotatably provided on the first arm portion 21 via the second joint portion 24; the hollow pipe 40 that has the first end portion 40A fixed to the first arm portion 21 and the second end portion 40B inserted into the second arm portion 22; the first fixing portion 41 that fixes the wiring portion 30 inserted into the hollow pipe 40, to the second end portion 40B of the hollow pipe 40; and the second fixing portion 42 that fixes the wiring portion 30 to the second arm portion 22.

In the adopted configuration of the embodiment, the hollow pipe 40 is provided in such a manner as to pass through the second joint portion 24 between the first arm portion 21 and the second arm portion 22, each of which rotates on its way, and the wiring portion 30 passes through the inside of the hollow pipe 40. Here, after the wiring portion 30 passes through the hollow pipe 40, the wiring portion 30 is fixed to the second end portion 40B of the hollow pipe 40 and the second arm portion 22. Since the second end portion 40B of the hollow pipe 40 is inserted into the second arm portion 22, the wiring portion 30 can be twisted (as illustrated by a reference sign T in FIG. 2) in the second arm portion 22 that is wider than the hollow pipe 40, and the wiring portion 30 can be prevented from rubbing against the hollow pipe 40.

In the adopted configuration of the embodiment, the first fixing portion 41 fixes the wiring portion 30 at a position higher than the center K of the second arm portion 22 in the direction of gravity, and the second fixing portion 42 fixes the wiring portion 30 at a position lower than the center K of the second arm portion 22 in the direction of gravity.

With the adopted configuration of the embodiment, it is possible to increase the gap between the first fixing portion 41 and the second fixing portion 42 in the second arm portion 22, and to decrease the amount of twisting of the wiring portion 30.

In the adopted configuration of the embodiment, the second arm portion 22 has the window for work 50 in the vicinity of the second fixing portion 42.

With the adopted configuration of the embodiment, it is possible to have direct access to the second fixing portion 42 via the window for work 50 in the second arm portion 22 through which maintenance work or the like can be easily performed.

In the adopted configuration of the embodiment, the wiring portion 30 includes a communication cable.

In the adopted configuration of the embodiment, even when a large-diameter communication cable passes through the hollow pipe 40, the communication cable occupying a large amount of the inner space, the wiring portion 30 can be twisted in a wide space of the second arm portion 22 without being twisted in a narrow space of the hollow pipe 40, and the wiring portion 30 can be prevented from rubbing against other portions.

According to the ceiling mounted robot 1 of the embodiment, it is possible to decrease a load applied to the wiring portion 30.

A preferred embodiment of the invention is described with reference to the accompanying drawings; however, the invention is not limited to the embodiment. In the embodiment, the shape of each configuration member, the combination of the configuration members, and the like are examples, and can be modified in various forms based on design demand and the like insofar as the modifications do not depart from the spirit of the invention.

Figure 6:
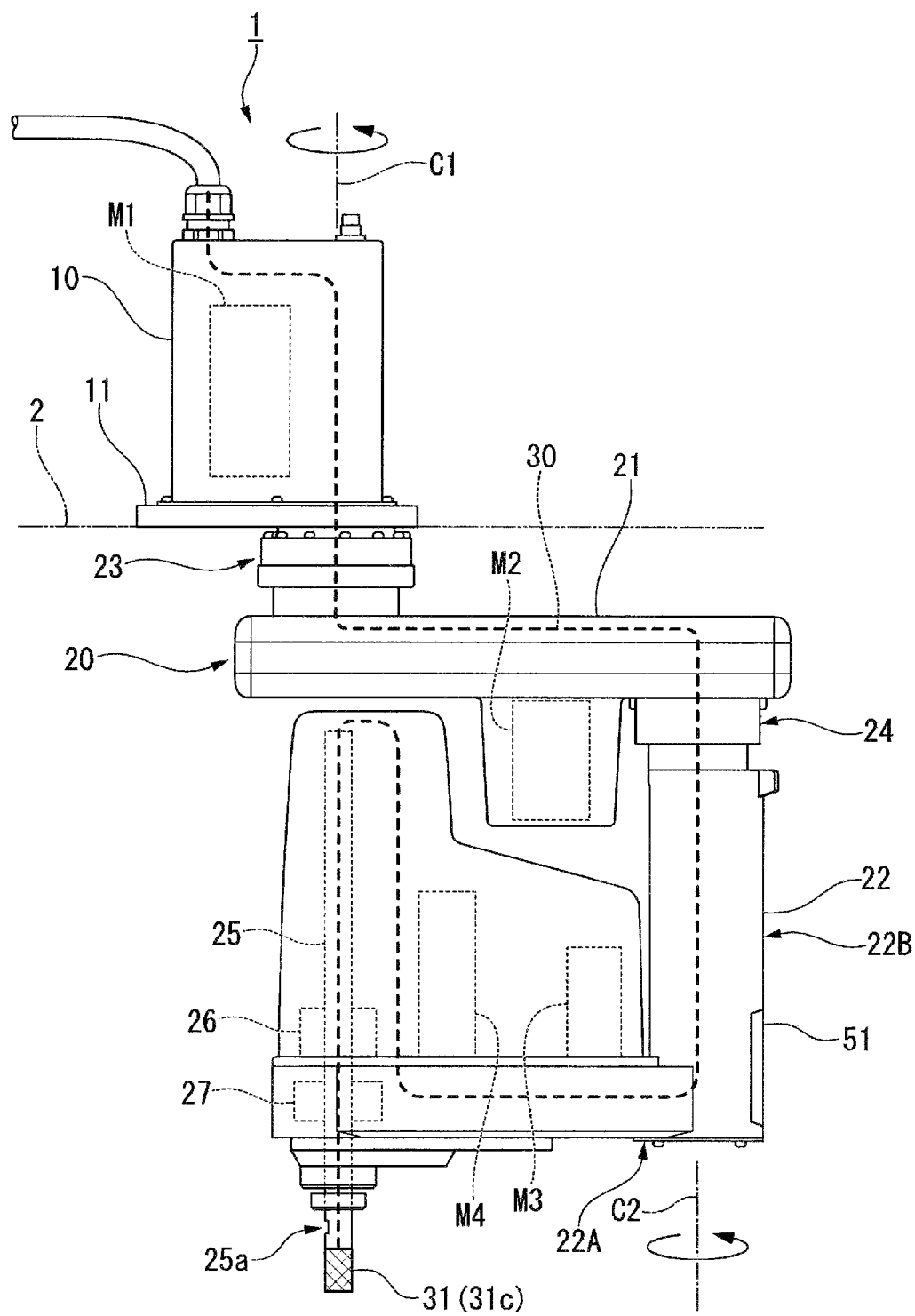
FIG. 6 is a view illustrating the entire configuration of the ceiling mounted robot according to another embodiment of the invention.

For example, the invention can adopt the configuration illustrated in FIG. 6.

FIG. 6 is a view illustrating the entire configuration of the ceiling mounted robot 1 according to another embodiment of the invention.

In FIG. 6, the same reference signs are assigned to configuration portions that are the same as or equivalent to those of the embodiment, and the description thereof will be briefly given or omitted.

According to the other embodiment illustrated in FIG. 6, in the ceiling mounted robot 1 having a hollow working shaft 25 that is provided in the second arm portion 22, and can move with respect to the second arm portion 22 in the direction of gravity, the wiring portion 30 is inserted into the working shaft 25.

In the adopted configuration of the embodiment, the wiring portion 30 is inserted into the hollow working shaft 25, and is connected to a connector portion 31c in the lower end portion 25a of the working shaft 25, and thereby the wiring portion 30 can be connected to a sensor (for example, a load sensor) on a hand or the like mounted on the working shaft 25.

For example, in the configuration of the embodiment, the connector portion 31 is provided in the second arm portion 22; however, the invention may adopt a configuration in which the connector portion 31 is provided in the base 10. In addition, the wiring portion 30 may be a LAN cable, and one end portion of the wiring portion 30 may be connected to a control unit that is provided in the articulated arm 20 (the second arm portion 22), and that controls a drive system of the ceiling mounted robot 1, and the other end portion of the wiring portion 30 may be connected to the connector portion 31 in the base 10. The ceiling mounted robot 1 may be connected to an Ethernet or the like via the connector portion 31 in the base 10, and the drive of the ceiling mounted robot 1 may be controlled therethrough.

For example, in the embodiment, the ceiling mounted robot 1 is a selective compliance articulated robot arm robot (SCARA robot) mounted on the ceiling; however, the invention is not limited to that configuration, and the ceiling mounted robot 1 may be a perpendicular articulated arm robot.

For example, in the embodiment, the first member is fixed like the base 10; however, the first member may be able to move like an arm. As such, the invention can be applied to a configuration in which three or more arms are provided.

The entire disclosure of Japanese Patent Application No. 2014-095737, filed May 7, 2014 is expressly incorporated by reference herein.

What is claimed is:

1. A ceiling mounted robot comprising:
   a first member;
   a first arm portion that is rotatably provided on the first member via a first joint portion;
   a second arm portion that is rotatably provided on the first arm portion via a second joint portion;
   first and second cables that are inserted into the first arm portion and the second arm portion;
   a first connector portion that is connected to the first cable;
   a second connector portion that is connected to the second cable,
   a hollow movable shaft portion that is provided in the second arm portion, and moves with respect to the second arm portion, and
   a detector that is connected to the first cable via the first connector portion,
   wherein the first and second cables are inserted into the hollow movable shaft portion,
   wherein the first arm portion directly abuts the first joint portion and the second joint portion and the second arm portion directly abuts the second joint portion, and
   wherein a bundle of the first and second cables is routed through the first member, the first joint portion, the first arm portion, the second joint portion, and the second arm portion, the bundle entering from an upper surface of the first member, the bundle exiting the first joint portion and entering the first arm portion at a first location, the bundle exiting the first arm portion and entering the second joint portion at a second location, and the bundle exiting the second joint portion and entering the second arm portion at a third location,
   the first connector portion is provided on a lower surface of the second arm portion in a direction of gravity,
   the second connector portion is provided on a side surface of the second arm portion, and
   an imaging unit that is connected to the second cable via the second connector portion,
   wherein the first connector portion exits the second arm portion in a direction that is perpendicular to an exiting direction of the second connector portion; and
   wherein the imaging unit is mounted on a side of the second arm portion that is opposite to a second connector portion mounting location.

2. The ceiling mounted robot according to claim 1, further comprising:
   a first motor disposed in the first member that drives the first arm portion to rotate around the first joint portion, and
   a second motor disposed in the first arm portion that drives the second arm portion to rotate around the second joint portion.

* * * * *